US012786694B2

(12) United States Patent
Bandyk et al.

(10) Patent No.: US 12,786,694 B2
(45) Date of Patent: Nov. 3, 2026

(54) SYSTEMS AND METHODS FOR SELECTIVELY GENERATING AND TRANSMITTING WIRELESS ADVERTISEMENTS

(71) Applicant: The Chamberlain Group LLC, Oak Brook, IL (US)

(72) Inventors: Edward Bandyk, Woodridge, IL (US); Edward Andrew Nelson, North Aurora, IL (US); Daniel James Even, Downers Grove, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 65 days.

(21) Appl. No.: 18/890,475

(22) Filed: Sep. 19, 2024

(65) Prior Publication Data

US 2026/0082207 A1 Mar. 19, 2026

(51) Int. Cl.
*H04W 8/22* (2009.01)
*H04W 84/18* (2009.01)

(52) U.S. Cl.
CPC .............. *H04W 8/22* (2013.01); *H04W 84/18* (2013.01)

(58) Field of Classification Search
CPC .. G06F 3/0418; G06F 3/0446; G06F 3/04184; G06F 3/044; G01R 29/26; G09G 2310/08; G09G 2354/00; G09G 3/20
See application file for complete search history.

(56) References Cited

U.S. PATENT DOCUMENTS

| | | | | |
|---|---|---|---|---|
| 11,666,414 B2 * | 6/2023 | Nedelcu | G06Q 10/0833 222/1 |
| 11,704,948 B2 * | 7/2023 | Nelson | H04W 12/082 340/5.61 |
| 11,790,708 B2 * | 10/2023 | Warrier | G01S 11/06 340/5.64 |
| 2007/0197261 A1 * | 8/2007 | Humbel | H04L 63/0853 455/558 |

(Continued)

FOREIGN PATENT DOCUMENTS

| | | |
|---|---|---|
| CA | 3054793 A1 | 9/2018 |
| CN | 105427562 A | 3/2016 |

OTHER PUBLICATIONS

International Search Report and Written Opinion, mailed on Nov. 24, 2025, by the ISA/EP, in International Application No. PCT/US2025/045492, 11 pages.

*Primary Examiner* — Curtis J King
(74) *Attorney, Agent, or Firm* — Foley IP Law, PLLC

(57) ABSTRACT

A method for communicating status and event information between a first device and a second device. The method includes the first device transmitting a status advertisement to the second device at a first transmission rate. The method further includes the first device detecting a trigger event triggering modified communication with the second device and generating an event advertisement including an event section corresponding to the trigger event. The method further includes the first device transmitting, to the second device, the event advertisement at a second transmission rate for a predetermined duration of time. The method further includes the first device, in response to the predetermined duration of time ending, resuming transmitting the status advertisement to the second device at the first transmission rate.

20 Claims, 5 Drawing Sheets

(56) References Cited

U.S. PATENT DOCUMENTS

| | | | | |
|---|---|---|---|---|
| 2015/0235486 | A1* | 8/2015 | Ellis | G07C 9/00309 340/5.61 |
| 2015/0302738 | A1* | 10/2015 | Geerlings | G07C 9/00571 340/5.25 |
| 2015/0319411 | A1* | 11/2015 | Kasmir | H04N 7/186 340/328 |
| 2015/0351145 | A1* | 12/2015 | Burks | H04L 63/102 455/41.3 |
| 2016/0242077 | A1* | 8/2016 | Horneman | H04W 36/22 |
| 2016/0300415 | A1 | 10/2016 | Deneen et al. | |
| 2017/0357226 | A1* | 12/2017 | Lucas | H04L 63/104 |
| 2017/0357425 | A1* | 12/2017 | Smith | G06F 3/0482 |
| 2017/0359191 | A1* | 12/2017 | Smith | G05B 15/02 |
| 2017/0359193 | A1* | 12/2017 | Smith | H04L 12/4625 |
| 2018/0091326 | A1* | 3/2018 | McLaughlin | H04L 67/535 |
| 2018/0130159 | A1* | 5/2018 | High | G05D 1/0088 |
| 2018/0144563 | A1* | 5/2018 | Reymann | E05F 15/76 |
| 2018/0349242 | A1* | 12/2018 | Mathews | H04W 12/37 |
| 2019/0387489 | A1* | 12/2019 | Idnani | H04W 48/16 |
| 2020/0177301 | A1* | 6/2020 | Kwak | H04W 4/80 |
| 2020/0351661 | A1* | 11/2020 | Kuenzi | G06Q 30/0267 |
| 2023/0127500 | A1* | 4/2023 | Burks | H04L 12/2818 700/19 |
| 2025/0341751 | A1* | 11/2025 | Igarashi | B60J 3/04 |

* cited by examiner

SYSTEMS AND METHODS FOR SELECTIVELY GENERATING AND TRANSMITTING WIRELESS ADVERTISEMENTS

BACKGROUND

In traditional bidirectional wireless communication systems, a peripheral device transmits advertisements for reception and processing by central devices. In some examples, the peripheral device can be scheduled to transmit the advertisement according to a broadcast schedule where the advertisement is transmitted to the central devices periodically according to the schedule. These scheduled advertisements can be utilized by the peripheral device for a number of different reasons, such as, for example, for relaying ongoing status information between the peripheral device and the central devices. Thus, the advertisements can be used for information relating to ongoing and enduring data, and not for data representative of a specified event that is only valid for a certain instance in time.

SUMMARY

The disclosed examples are described in detail below with reference to the accompanying drawing figures listed below. The following summary is provided to illustrate some examples disclosed herein.

Example solutions include systems and associated methods for generating and transmitting event-specific advertisements. One such method includes a first device transmitting a status advertisement to a second device at a first transmission rate. The method further includes the first device detecting a trigger event triggering modified communication with the second device and generating an event advertisement including an event section corresponding to the trigger event as well as the status section. The method further includes the first device pausing transmitting the status advertisement at the first transmission rate and transmitting, to the second device, the event advertisement at a second transmission rate for a predetermined duration of time. The method further includes the first device, in response to the predetermined duration of time ending, resuming transmitting only the status advertisement to the second device at the first transmission rate.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

In traditional bidirectional wireless communication systems, scheduled advertisements can be utilized by a peripheral device for a number of different reasons, such as, for example, for relaying ongoing status information between the peripheral device and central devices. Thus, the scheduled advertisements can be used for information relating to ongoing and enduring data, and not for data representative of a specified event that is only valid for a certain instance in time.

In remote-controlled movable barrier systems, scheduled status advertisements can be broadcast from controlling devices periodically to provide a movable barrier operator with status information. While these status advertisements are useful in relaying status information, which is typically ongoing data not tied to a certain instance in time, the status advertisements are not practical for including data related to a specific event, which is only relevant for an instance in time. That is, including event-specific information in status advertisements that are transmitted periodically and continually from the controlling device is undesirable, as the event-specific information is only valid for a given instance in time and should not be continually communicated to the operator.

As will be discussed in greater detail below, example solutions of this disclosure provide for a peripheral device configured to generate event-specific advertisements using event advertisement operations where the event-specific advertisements are scheduled to be broadcasts within a defined time period. This way, event-specific data can be communicated to the central devices during the defined time period and can be removed from the advertisements broadcasted after the defined period ends so as not to persist in sending event-specific data that is only relevant for a certain instance in time.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
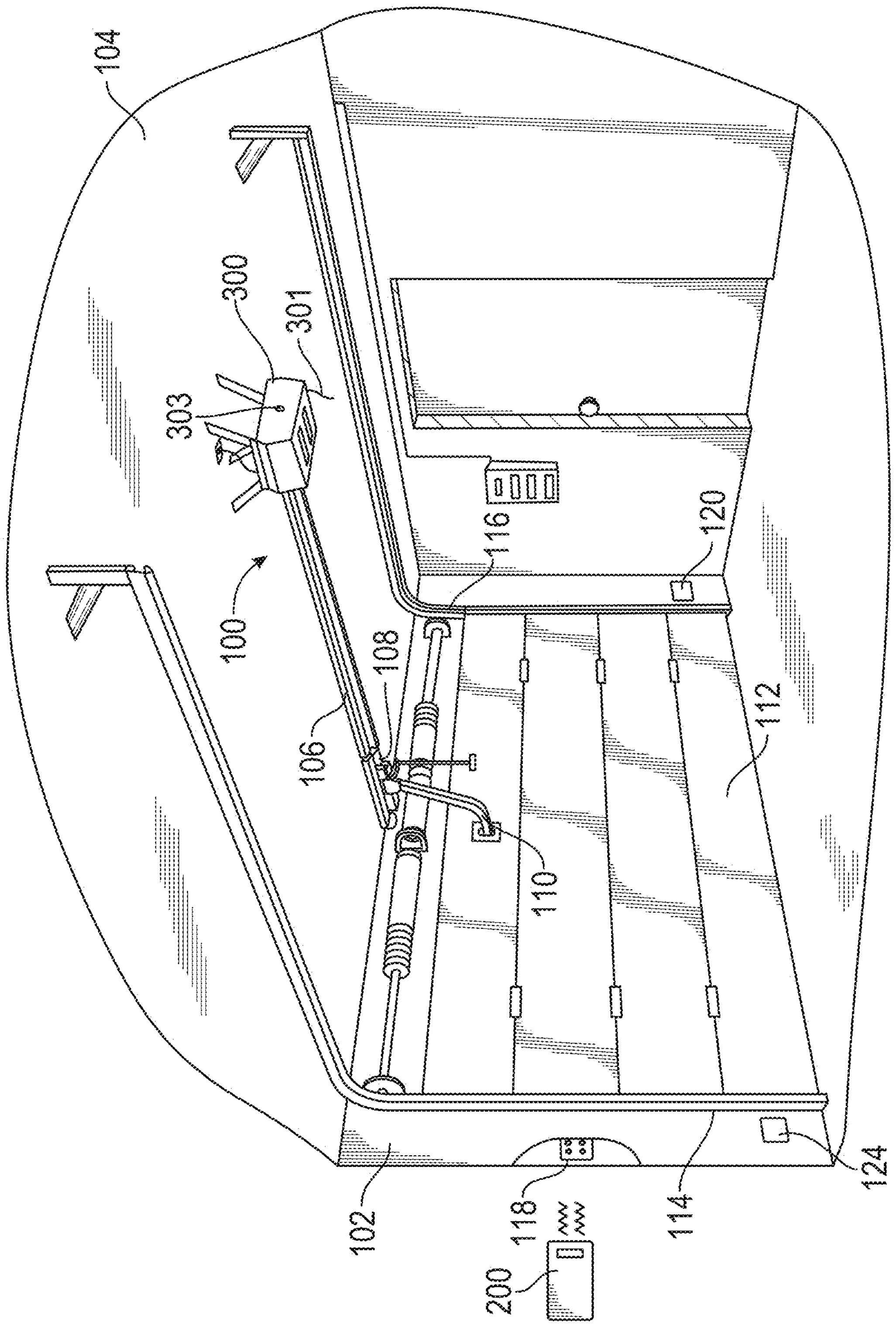
FIG. 1 illustrates a movable barrier system, according to an example of this disclosure.

FIG. 1 illustrates a movable barrier operator system 100 that includes a movable barrier operator 300 and a control device 200. As shown, according to some examples, system 100 is utilized in a garage 102 setting. Control device 200 can comprise any of various known control devices, such as, for example, a handheld device such as a remote control, a wall-mounted control device, a control device integral to a vehicle, or the like. In the illustrated example, operator 300 is mounted to the ceiling 104 of the garage 102 and includes a rail 106 extending therefrom with a releasable trolley 108 attached having an arm 110 extending to a barrier 112 positioned for movement along a pair of door tracks 114, 116. In this example depicting a garage 102 setting, barrier 112 comprises a garage door. Control device 200 is adapted to send signals to and receive signals from the operator 300. An antenna 301 may be positioned on the operator 300 and coupled to a receiver as discussed hereinafter in order to receive transmissions from the control device 200. An external control pad 118 may also be positioned on the outside of the garage 102 and include a user interface thereon for receiving user commands that are communicated via radio frequency transmission with the antenna 301 of the operator 300. In some examples, the external control pad 118 is accessible from an outside location and in some examples constitutes a control device 200. An optical emitter 120 may be used with an optical detector 124 in order to prevent closing of the barrier 112 on a person or object inadvertently in the door's path. An input such as a button or switch 303 may be provided for switching the operator 300 between modes, such as operating mode and learn mode. FIG. 1 depicts an illustrative example of a movable barrier system according to one example of this disclosure in a garage environment, and those with skill in the art will recognize that various other movable barrier examples in various other settings fall within the scope of this disclosure. For example, other movable barrier environments of this disclosure include environments such as over-head doors used for bays, room dividers, gates, and any other movable barrier controlling or providing access to an area.

Figure 2:
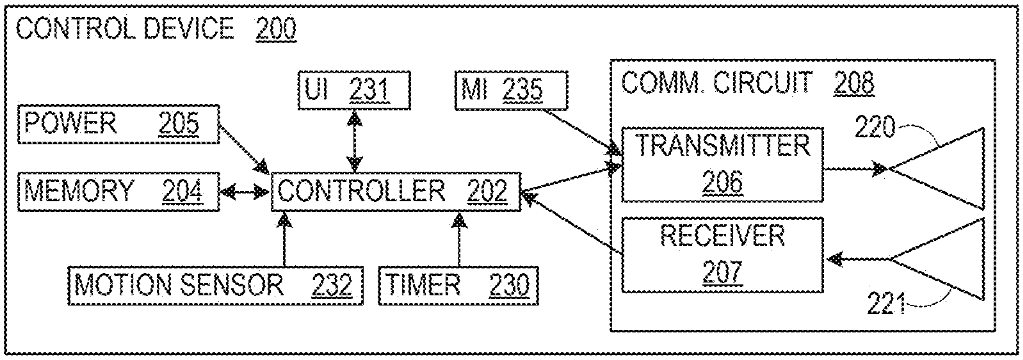
FIG. 2 is a block diagram illustrating an example of a user-operated control device of the system of FIG. 1.

FIG. 2 illustrates a block diagram of the control device 200. Control device 200 includes a communication circuit 208 comprising both a transmitter 206 and receiver 207 (which may be combined into a single transceiver mechanism) in operative communication with antennas 220 and 221, respectively. The antennas can be positioned in, on, or extending from the control device 200, wherein the transmitter 206 and receiver 207 are configured for wirelessly transmitting and receiving transmission signals to and from the operator 300, including transmission signals that contain a first rolling access code with a fixed code portion and a rolling code portion. In some embodiments, both the transmitter and receiver may communicate with a single antenna or multiple antennas, and in some examples the transmitter and receiver may be configured to be a single transceiver device in communication with a single antenna. Control device 200 also includes a controller 202 in operative communication with the transmitter 206 and a memory 204 and is configured for processing data and carrying out commands. The memory 204 may be, for instance, a non-transitory computer readable medium, and may have stored thereon instructions that when executed by a controller circuit cause the controller circuit to perform operations. A power source 205 is coupled to the controller 202 and/or other components, and may be routed in some embodiments so that a user interface (UI), such as UI 231, couples/decouples the power source to other components so that power is supplied only upon activation of the UI 231 or a specified time thereafter. Controller 202 is configured to generate the transmission signal with a signal identifier and cause the transmitter 206 to transmit the signal, and the receiver 207 is configured to receive responsive transmissions from one or more operators 300. Optionally, a timer 230 in communication with the controller 202 enables the controller 202 to determine the time of incoming and outgoing signal transmissions and provides reference for the controller 202 to enable and disable the transmitter 206 and/or receiver 207 of the device. Optionally, control device 200 includes a motion sensor 232 which can be used to detect motion occurring in proximity to control device 200. In some examples, where control device 200 is a wall-mounted control device mounted within garage 102 for controlling operator 300, motion sensor 232 can be used to detect motion within garage 102. In some examples, a manual setting interface (MI) 235 may be provided, which in some forms may include one or more dual in-line package (DIP) switches or other devices configured to allow a user to configure a setting or state of the controller 202. MI 235 may be operatively coupled to the transmitter 206 in order to allow for signal transmissions including information regarding the current setting or state of the manual setting interface. Memory 204 is connected for operative communication with controller 202 and is configured to store data such as codes and, in some examples, other information for outgoing transmissions. Memory 204 is further configured to store fixed and/or changing or variable code information for comparison to incoming transmissions.

UI 231 may include one or more user-operable switches for inputting commands to the control device 200, for example to issue a barrier movement command or a learning command. UI 231 may be associated with a button, lever, or other device to be actuated, for example by a user's hand or other actions, events, or conditions. As other examples, the UI 231 may be voice operated or operated by a user contacting a touch-sensitive screen as the location of an object displayed on the screen. The UI 231 may include multiple buttons, levers, switches, displays, microphone(s), speaker(s), or other inputs associated with different tasks, or operations, to be carried out by the operator 300. As one example, the UI 231 includes a plurality of mechanical buttons that each operate a respective switch. As another example, UI 231 includes a display with one or more virtual buttons.

Figure 3:
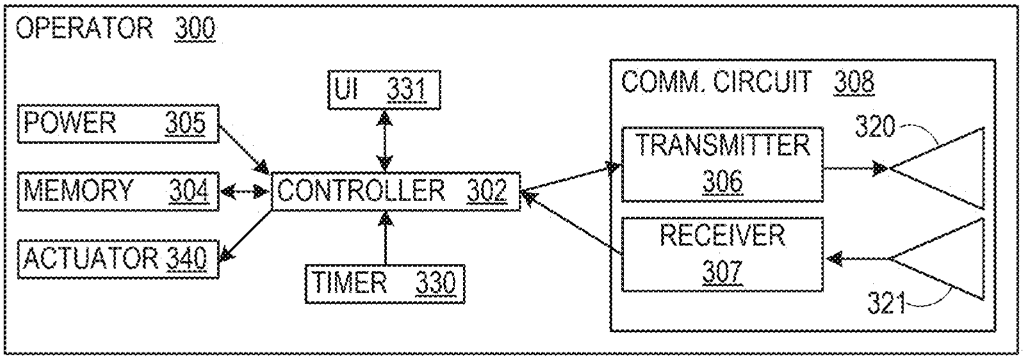
FIG. 3 is a block diagram illustrating an example of a movable barrier operator of the system of FIG. 1.

FIG. 3 illustrates a block diagram of operator 300. According to various examples, the operator 300 includes a controller 302 in communication with a memory 304 and is configured for storing and retrieving data to and from the memory 304 as well as processing data and carrying out commands. A power source 305, such as an AC power conduit, battery, or other type of power source, supplies electricity to the controller 302 to allow operation. As an example, power source 305 may include an AC power conduit, a power conditioning circuit, a battery, and/or a battery charging circuit. Operator 300 also includes a communication circuit 308 comprising a wireless transmitter 306 and receiver 307 (or combination transceiver device) in operative communication with the controller 302. As shown, transmitter 306 communicates with a first antenna 320 and receiver 307 communicates with a second antenna 321, but both devices may communicate with a single antenna or multiple antennas, and in some embodiments the device may be configured to have a single transceiver device in communication with a single antenna. The antennas may be positioned in, on, or extending from the operator 300. In this regard, signals, such as radio frequency or other wireless transmission carriers, may be sent to and received from the control device 200 according to a variety of frequencies or modulations. Signals may be modulated in a number of different ways; thus, the control device 200 and movable barrier operator 300 may be configured to communicate with one another via a variety of techniques. Controller 302 of the operator 300 is also in communication with an actuator such as an actuator 340 in order to carry out an operation such as moving a barrier, which may include for example lifting or lowering a bay or a garage door; sliding, swinging, or rotating a gate; or otherwise moving or repositioning a barrier structure. Actuator 340 can comprise any actuating device for moving the associated movable barrier, such as, for example, a motor, a pneumatic or hydraulic actuator, a linear motion actuator, a rotary actuator, or the like.

User Interface (UI) 331, which includes one or more input devices such as buttons, keys or a touch-screen interface, for example, receives user input to override the controller 302 or place the controller in and out of a learning mode in which the operator 300 may be paired with a user-operated device, such as control device 200, by exchanging and storing messages.

The term controller refers broadly to any microcontroller, application specific integrated circuit (ASIC), field programmable gate array (FPGA), computer, state machine, or processor-based device with processor, memory, and programmable input/output peripherals, which is generally designed to govern the operation of other components and devices. It is further understood to include common accompanying accessory devices. The controller can be implemented through one or more processors, microprocessors, central processing units, logic, local digital storage, firmware, software, and/or other control hardware and/or software and may be used to execute or assist in executing the steps of the processes, methods, functionality, and techniques described herein. Furthermore, in some implementations the controller may provide multiprocessor functionality. These architectural options are well known and understood in the art and require no further description here. The controllers may be configured (for example, by using corresponding programming stored in a memory as will be well understood by those skilled in the art) to carry out one or more of the steps, actions, and/or functions described herein.

When a user actuates UI 231 of the control device 200, such as by pressing a button designated as performing a particular action, the controller 202 activates the transmitter 206 to transmit through antenna 220 a message based on information stored in the memory 204. The message is received by the receiver 307 of operator 300 and communicated to the operator's controller 302. In some embodiments, the controller 302 verifies the message by comparing the message to stored information from the operator's memory module 304, and upon verification the controller 302 is configured to cause transmission of a response signal from the transmitter 306 through antenna 320. If the message from the user-actuated control device 200includes information relating to timing parameters for a response, the operator's controller 302 receives time information from a timer 330 in order to determine when to transmit the response in order to comply with timing parameters of the control device 200.

The control device 200 may be configured to verify that the response from the operator 300 complies with transmitted timing requirements in any number of ways. In some embodiments, controller 202 may compare a time stamp or other timing information relating to the operator's response to the transmitted time parameter using timer 230. In some embodiments, receiver 207 is generally inactive, but switched on by controller 202 only for a short time period consistent with the transmitted timing parameter. For instance, controller 202 may switch on receiver 207 for a window of time matching a time window transmitted in an outgoing message through transmitter 206, and upon expiration of the time window according to timer 230, controller 202 switches receiver 207 off again. Timing information may be either relative, for instance a specified number of seconds, milliseconds, or nanoseconds after transmission of an outgoing signal or other event, or may be absolute such as standard date and time information for a specific time zone. A timing synchronization protocol may be provided in some forms in order to maintain precision of timing with other devices despite drift or other factors.

As discussed, communication circuits 208, 308 can comprise two-way communication circuits configured to both transmit and receive communications signals. In some examples, communication circuits 208, 308 comprise short-range wireless communication modules, such as Bluetooth or Bluetooth low energy (BLE) modules or circuits, for example. As such, as those with skill in the art will understand, all wireless communication connections referred to herein utilized by operators 300 and control devices 200 can be any known short-range wireless communication connections, such as Bluetooth or BLE connections, for example.

Figure 4:
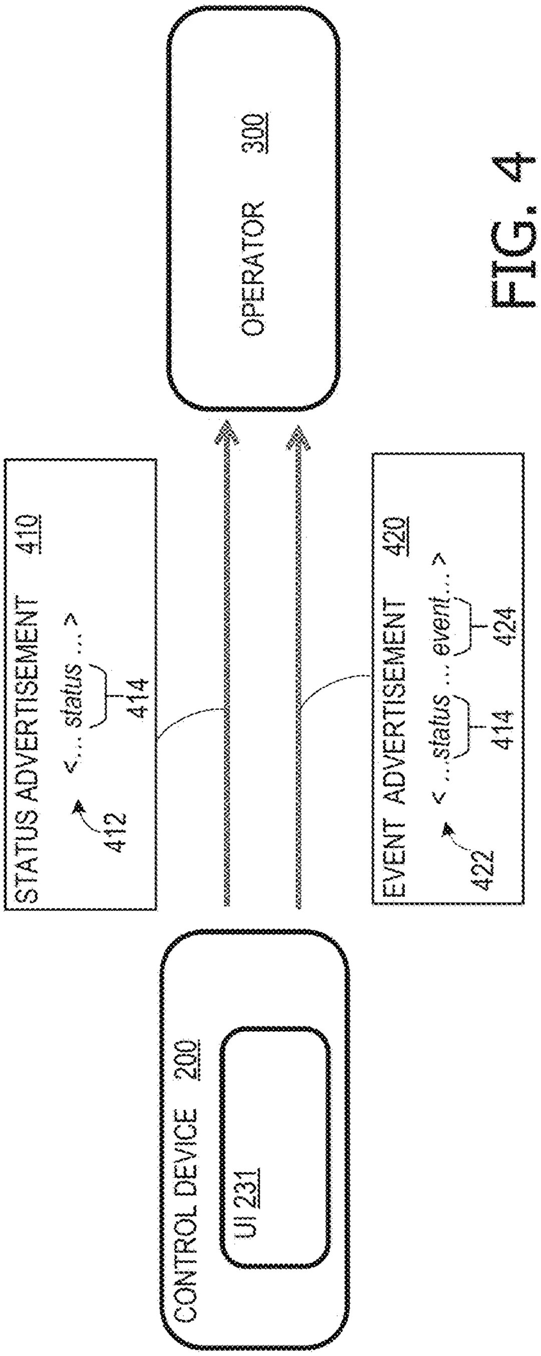
FIG. 4 is a diagram illustrating advertisements transmitted by a user-operated control device of the system of FIG. 1.

FIG. 4 is a diagram illustrating control device 200 transmitting advertisements 410, 420 that can be received by operator 300. As will be discussed in greater detail, control device 200 can transmit different types of advertisements to operator 300, such as a status advertisement 410 and an event advertisement 420, for example. Status advertisement 410 and event advertisement 420 are generated by controller 202 and transmitted via communication circuit 208 where the advertisements 410, 420 are received by controller 302 via communication circuit 308.

Status advertisement 410, generated by controller 202, includes a protocol data unit (PDU) 412 which, as those with skill in the art will understand, is comprised of various protocol, control, and device data. One such piece of data is status information included in a status section 414. Information included in the status section 414 can be ongoing or enduring data related to the operational status or health of system 100. In some examples, information included in status section 414 is status information that controller 202 is programmed to periodically and regularly transmit to operator 300 according to a predetermined transmission schedule. Event advertisement 420 includes a PDU 422 including the status section 414 and further including an event section 424. As will be discussed in further detail below, controller 202 is configured to generate event advertisement 420 in response to detecting an event related to system 100 that is programmed to controller 202 to trigger communication with operator 300. For example, controller 202 can be programmed to relay certain events to operator 300 and, in some examples, controller 302 of operator 300 is configured to perform a certain action related to the detected event in response to receiving event advertisement 420 and identifying event section 424.

Figure 5:
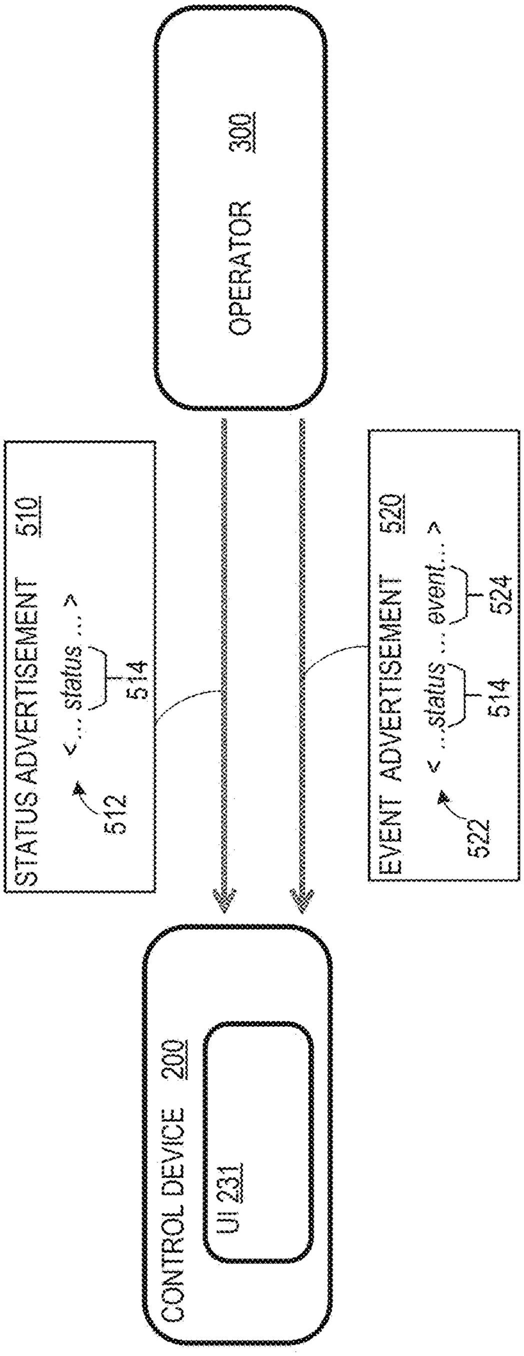
FIG. 5 is a diagram illustrating advertisements transmitted by a movable barrier operator of the system of FIG. 1.

FIG. 5 illustrates a scenario in which operator 300 is an advertising device and sends advertisements 510, 520 to control device 200. Advertisements 510, 520 are generated by controller 302 and transmitted via communication circuit 308 and thereby received by controller 202 via communication circuit 208. Advertisement 510 is a status advertisement substantially the same as status advertisement 410 previously discussed. Status advertisement 510 includes a PDU 512 including a status section 514 substantially the same as status section 414. Information included in the status section 514 can be ongoing or enduring data related to the operational status or health of system 100. In some examples, information included in status section 514 is status information that controller 302 is programmed to periodically and regularly transmit to control device 200 according to a predetermined transmission schedule. Information included in status section can include various information related to the status of operator 300, such as, for example, operator cycle count, a time setting for a work light for the operator 300, a number of control devices learned to or paired with operator 300, and various other status related information. Advertisement 520 is an event advertisement substantially the same as event advertisement 420 previously discussed. Event advertisement 520 includes a PDU 522 including status section 514 and an event section 524 substantially the same as event section 424 previously discussed.

Herein, in some examples control device 200 can be referred to as an "advertising device," as control device 200 can send advertisements 410, 420. In some examples, operator 300 can be referred to as a "receiving device" because it is a device that receives the advertisements transmitted from the advertising device. However, in other examples, operator 300 can be referred to as an advertising device, as operator can send advertisements 510, 510, and control device 200 can be referred to as a receiving device that receives advertisement from an advertising device. As will be recognized by those with skill in the art, advertising devices herein can also be referred to as peripheral devices that transmit advertisements, and receiving devices herein can be referred to as central devices that receive the advertisement, according to terminologies commonly used in BLE and similar two-way communication environments.

Figure 6:
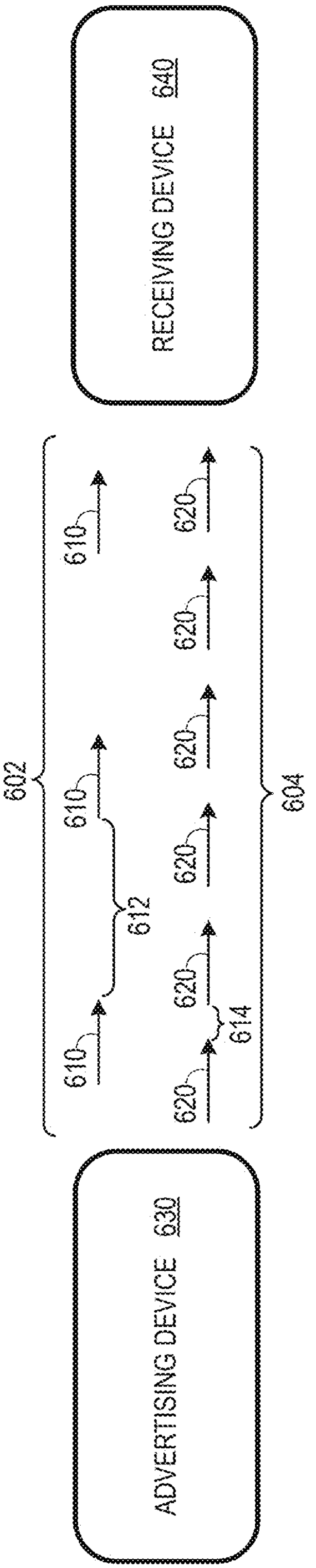
FIG. 6 illustrates advertisement operations that can be performed by various devices of the system of FIG. 1.

FIG. 6 illustrates advertisements operations 602, 604 performed by an advertising device 630 for transmitting advertisements to a receiving device 640. As those with skill in the art will recognize, in some examples, advertising device 630 comprises control device 200 and receiving device 640 comprises operator 300. In other examples, those with skill in the art will recognize that advertising device 630 comprises operator 300 and receiving device 640 comprises control device 200. The controller of advertising device 630 (such as controller 202 or 302) is configured to perform a status advertisement operation 602 in which the controller transmits status advertisements 610 via a communication circuit (such as communication circuit 208 or 308) at a first transmission rate 612 associated with the status advertisement operation 602. In examples where control device 200 is advertising device 630, status advertisement 610 is status advertisement 410 discussed in FIG. 4. In examples where operator 300 is advertising device 630, status advertisement 610 is status advertisement 510 discussed in FIG. 5. In some examples, status advertisement operation 602 is persisted by the controller of advertising device 630 indefinitely until the controller detects an event that initiates a different advertisement operation by the controller, such as event advertisement operation 604, or an event that the controller is otherwise programmed to recognize and stop or alter status advertisement operation 602. That is, in some examples, there is no overarching timeframe associated with status advertisement operation 602, and status advertisement operation 602 may be performed by the controller of advertising device 630 as a default advertisement operation in order to periodically communicate status information with receiving device 640. In some examples, the controller of advertising device 630 is configured to perform status advertisement operation 602 as a default setting to periodically and regularly provide status advertisements 610 to receiving device 640 as part of a predetermined status transmission schedule.

The controller of advertising device 630 is programmed to transmit status advertisements 610 according to a status advertising transmission rate 612. In some examples, the transmission rate 612 at which the controller transmits status advertisement 610 during status advertisement operation 602 is once every three seconds, however, those with skill in the art will recognize that the transmission rate 612 utilized in status advertisement operation 602 can be more or less than once every three seconds according to various examples of this disclosure. Accordingly, by status advertisement operation 602, status updates can be periodically provided to receiving device 640 using status advertisement 610. Additionally, in some examples, based on the status advertisement 610, a bidirectional communication connection is formed between advertising device 630 and receiving device 640 such that the devices can communicate status updates and related information, request, and commands to each other bidirectionally.

The controller of advertising device 630 is configured to perform an event advertisement operation 604 in which the controller transmits event advertisements 620 via its associated communication circuit at a second transmission rate 614 associated with the event operation 604. In some examples, the rate 614 of transmission utilized in event advertisement operation 604 is faster than the rate 612 of transmission utilized in status advertisement operation 602. In some examples, the transmission rate 614 at which the controller of advertising device 630 transmits event advertisement 620 during event advertisement operation 604 is once every 150 milliseconds, however, those with skill in the art will recognize that the transmission rate utilized in event advertisement operation 604 can be more or less than once every 150 milliseconds according to various examples of this disclosure. Additionally, as will be discussed in greater detail below, the controller of advertising device 630 is configured to initiate event advertisement operation 604 in response to detecting an event for communicating to receiving device 640. Accordingly, unlike status advertisement operation 602, the controller of advertising device 630 performs event advertisement operation 604 for a predetermined amount of time since the associated detected event is only valid for an instance in time, and does not need to be continually communicated to receiving device 640. In some examples, the controller of advertising device 630 performs event advertisement operation 604 for a total operation period of 500 milliseconds, however, those with skill in the art will recognize that total operation time period for event advertisement operation 604 can be more or less than 500 milliseconds according to various examples of this disclosure.

FIG. 6 illustrates status advertisement operation 602 and event advertisement operation 604 together, although advertising device 630 will only perform one advertisement operation at a time. Operations 602 and 604 are illustrated together to illustrate how advertising device 630 transmits event advertisement 620 during event advertisement operation 604 at a faster transmission rate 614 than the transmission rate 612 it transmits status advertisements 610 during status advertisement operation 602.

Figure 7:
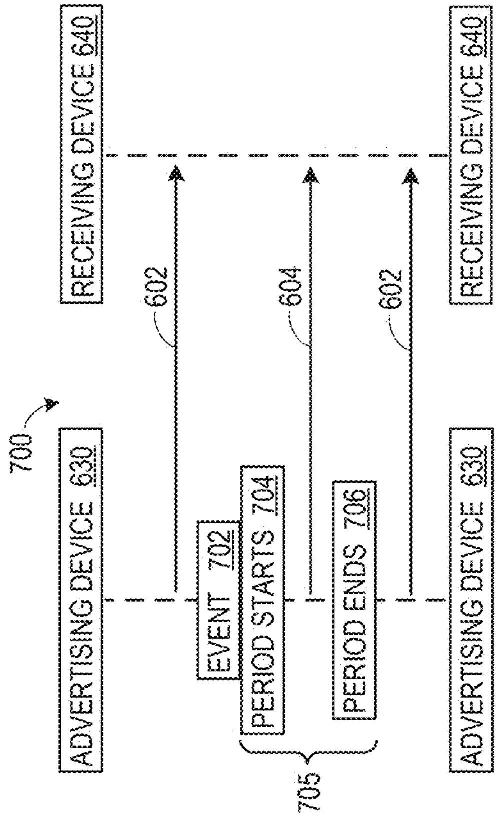
FIG. 7 is a diagram illustrating a sequence for alternating advertisement operations that can be performed by various devices of the system of FIG. 1.

FIG. 7 illustrates an operation 700 for changing advertising operations based on detecting a trigger event. Advertising device 630 initiates status advertisement operation 602 by transmitting status advertisement 610 at first transmission rate 612. As previously stated, in some examples, status advertisement operation 602 is performed as a default operation and there is no overarching time period defining status advertisement operation 602. Advertising device 630 can continue to transmit status advertisements 610 at the first transmission rate 612 indefinitely until detecting an event programmed to stop or otherwise alter status advertisement operation 602.

One such event that alters advertising device 630 controller's performance of status advertisement operation 602 is a trigger event 702. Trigger events 702 can take many forms, and can include events related to movable barrier system 100 that, when detected by the advertising device 630, are programmed to trigger communication with the receiving device 640. Specifically, the controller of advertising device 630 is programmed to generate event advertisement 620 in response to detecting trigger event 702 and include event information related to event 702 in event section 424, 524.

As an illustrative example, referencing FIG. 1, trigger event 702 can be an event detected by motion sensor 232 of control device 200, which is used to detect movement within garage 102. In some examples, control device 200 is a wall-mounted control device, such as a device mounted inside of garage 102 for controlling operation of operator 300, and can include a motion sensor 232, such as a passive infrared (PIR) sensor, for example, for detecting motion within garage 102, and can be considered the advertising device 630 to communicate the trigger event 702 with operator 300, which is the receiving device 640. Accordingly, controller 202 can determine when motion is detected within garage 102 based on readings received from PIR sensor 232; i.e., controller 202 can detect a trigger event 702 when the trigger event is motion detected within the garage 102. In other examples, operator 300 detects a trigger event 702 and can be the advertising device 630 for communicating the trigger event 702 to control device 200, which is the receiving device 640. Accordingly, controller 302 can determine when a trigger event 702 occurs, where the trigger event 702 can be any of a number of preprogrammed event related to operations of system 100 that is programmed to initiate communication via event broadcast operation 604.

The controller of advertising device 630 can be programmed to initiate event advertisement operation 604 in response to detecting the trigger event 702 and generate event advertisement operation 604 including information related to the detected trigger event 702 in event section 424, 524. For example, using one of the previously discussed examples, controller 202 can include information in event section 424 related to detecting motion within garage 102 based on readings from the PIR sensor 232. The controller of advertising device 630 can then initiate event advertisement operation 604 by transmitting event advertisement 620 at second transmission rate 614. Additionally, before or concurrent with beginning event advertisement operation 604, the controller of advertising device 630 can pause, suspend, or otherwise stop performing status advertisement operation 602.

As previously discussed, event advertisement operation 604 is performed by the controller of advertising device 630 for a predefined period of time 705, the start of the period 705 being represented in FIG. 7 by block 704. In some examples, event advertisement 620 is generated by the controller of advertising device 630 by adding event section 424, 524 to the PDU 412, 512 to form PDU 422, 522. In these examples, the controller of advertising device 630 stores the starting position and length of event section 424, 524 within PDU 422, 522 for future reference, as will be discussed below. During the predefined period 705, advertising device 630 transmits event advertisement 620 until the period ends, the end of the period being represented in FIG. 7 by block 706. As presented previously in one illustrative example, transmission rate 614 can be once every 150 milliseconds and the predefined period 705 for event advertisement operation 604 can be 500 milliseconds. Accordingly, in this illustrative example, advertising device 630 transmits event advertisement 620 three times during event advertisement operation's 604 predefined time period 705 before the period ends. According to various examples, the controller of receiving device 640 will not act on or processes each of the three event advertisements 620, as each event advertisement 620 can have matching sequence identifiers such that the controller of receiving device 640 knows not to act on an event advertisement 620 with a sequence identifier matching the sequence identifier of an event advertisement 620 already received and acted upon. Thus, one reason multiple event advertisements 620 are transmitted during event advertisement operation 604 is for redundancy purposes to ensure the event advertisement 620 is received by the central device or devices in the area, such as receiving device 640.

The controller of receiving device 640 receives event advertisement 620 during event advertisement operation 604, identifies the event-specific information from event section 424, 524, and processes the information or performs an action corresponding to the event. For example, when operator 300 is the receiving device 640 and the trigger event 702 is motion detected by the PIR sensor 232, operator controller 302 identifies the information related to the trigger event 702 in event section 424 and is programmed to perform a corresponding action. In some examples, controller 302 is configured to activate an overhead light of UI 331 for a predefined period of time in response to event section 424 including information related to motion being detected within garage 102. For example, controller 302 can turn on the overhead light for five seconds when the PIR sensor 232 detects motion within garage 102. In other examples, when control device 200 is the receiving device 640, control device controller 202 identifies the information related to the trigger event in event section 524 and is programmed to perform a corresponding action. In some examples, controller 202 is configured to display a message via UI 231 for a predefined period of time in response to event section 524 including information related the trigger event 702. In response to the event advertisement operation 604 period of time ending 706, advertising device 630 resumes or otherwise starts performing status advertisement operation 602. In some examples, the controller of advertising device 630 generates status advertisement 610 by referencing the stored starting location and length of event section 424, 524 within PDU 422, 522 to locate the event section 424, 524 within PDU 422, 522. The controller of advertising device 630 then removes the identified event section 424, 524 from PDU 422, 522 to form PDU 412, 512 of the status advertisement 410, 510.

There are various advantages with using advertisement operations 602, 604 with varying transmission rates 612, 614 as illustrated in operation 700. When event 702 is detected, advertising device 630 transmits during the predefined period 705 using event advertisement operation 604 at the fast transmission rate 614 to ensure receiving device 640 receives event advertisement 620 in a timely fashion. This allows receiving device 640 to act on the event advertisement 620 in a moment in time rather than acting upon an event that happened potentially seconds, minutes, or hours earlier. After the predefined period ends in block 706, the advertising device 630 switches to transmitting at slower transmission rate 612, thereby allowing for better use of energy, spectrum sharing, and processing time by receiving device 640.

According to various examples, all necessary information needed for receiving device 640 to take action is included in the advertisement 610, 620 itself. According to various examples, receiving device 640 does not attempt to form a bidirectional communication connection with advertising device 630 responsive to advertisement 610, 620. That is, advertisement 610, 620 can be considered a unidirectional broadcast transmitted from advertising device 630 to receiving device 640. Receiving device 640 can identify information included in the status and event sections of the advertisement 610, 620 and perform pre-programmed actions based on the information or otherwise process the information included in the status and event sections.

Figure 8:
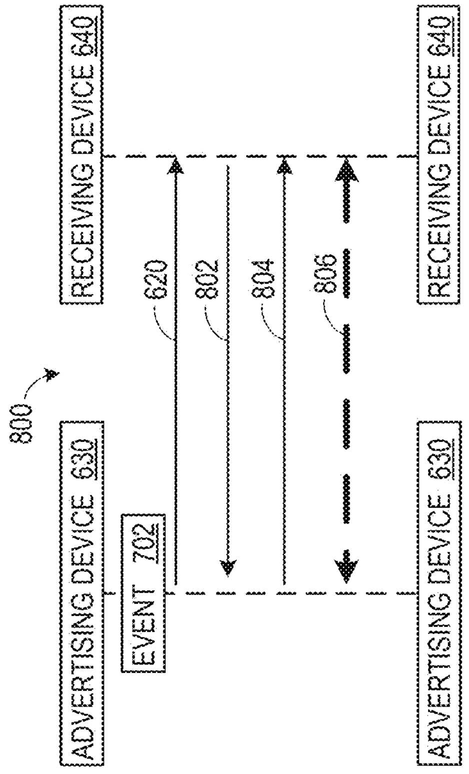
FIG. 8 is a diagram illustrating establishing a wireless connection that can be performed by various devices of the system of FIG. 1.

However, in some examples, a bidirectional communication connection is formed between advertising device 630 and receiving device 640 responsive to advertisement 610, 620. For example, FIG. 8 illustrates an operation 800 for forming a bidirectional communication connection between advertising device 630 and receiving device 640 responsive to event advertisement 620. As previously stated, in response to detecting event 702, advertising device 630 initiates event advertisement operation 604 wherein event advertisement 620 is transmitted by the controller of advertising device 630 to receiving device 640, where event advertisement 620 is received by the controller of receiving device 640. In response, according to some examples, the controller of receiving device 640 generates a connection request 802 and transmits connection request 802 via its communication circuit, which is received by advertising device 630. In response, the controller of advertising device 630 generates connection response 804 and transmits response 804 via its communication circuit, which is received by receiving device 640. Thereby, a bidirectional communication connection 806 is formed between advertising device 630 and receiving device 640. Advertising device 630 and receiving device 640 can communicate data, commands, request, and other information to each other bidirectionally via connection 806. For example, data, commands, requests, and other information related to trigger event 702 can be communicated via connection 806.

Although FIG. 8 illustrates a bidirectional communication connection formed responsive to event advertisement 620, those with skill in the art will recognize that similar communication connections are formed between the advertising device 630 and the receiving device 640 according to various examples. In some examples, a bidirectional communication connection is formed between advertising device 630 and receiving device 640 responsive to status advertisement 610 using operations substantially similar to operation 800, as those with skill in the art will recognize.

Figure 9:
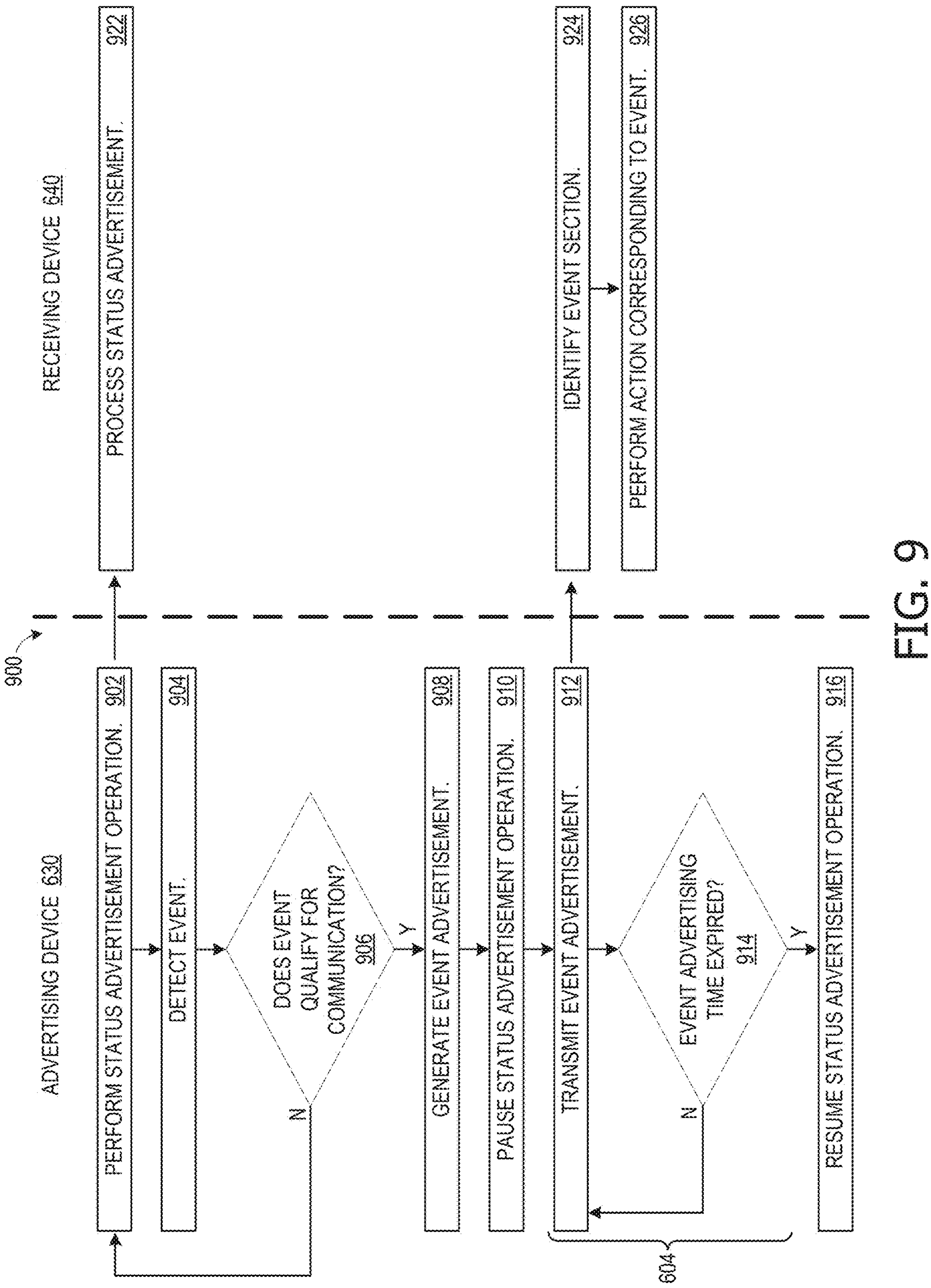
FIG. 9 is a flowchart illustrating a method generating and transmitting an event-specific advertisement that can be performed by various devices of the system of FIG. 1.

FIG. 9 is a flowchart illustrating a method 900 of performing various advertisement operations for communicating different types of data. As those with skill in the art will understand, the blocks 902-916 disposed left of the central dashed line can be performed by any of the advertising devices discussed herein, such as advertising device 630, for example. Similarly, the blocks 922-926 disposed right of the central dashed line can be performed by any of the receiving devices discussed herein, such as receiving device 640, for example. Method 900 can begin at block 902 by the controller (such as controller 202 or 302) of advertising device 630 performing status advertisement operation 602 for communicating status information to receiving device 640. As discussed herein, status advertisement operation 602 includes the controller of advertising device 630 transmitting status advertisements 610 at a first transmission rate 612 associated with status advertisement operation 602. Status advertisement 610 is received by receiving device 640 in block 922, and the controller (such as controller 202 or 302) of receiving device 640 performs associated data processing and/or actions based on identifying status section 414, 514 of status advertisement 610. For example, when control device 200 is receiving device 640 and operator 300 is advertising device 630, block 922 can include control device controller 202 identifying status section 514 and processing information included in status section 514. As previously discussed, status section 514 can include information related to the status of operator 300, such as, for example, operator cycle count, a time setting for a work light for the operator 300, a number of control devices learned to or paired with operator 300, and various other status related information. Control device controller 202 can store this information included in status section 514 for access by a user utilizing an interactive display of UI 231 for accessing a status menu where the information of status section 514 related to operator 300 and system 100 can be found.

Method 900 can continue to block 904 where the controller of advertising device 630 detects an event associated with the movable barrier system 100 and, in block 906, determines whether the event qualifies for communicating with receiving device 640. In response to determining that the event does not qualify for communication with receiving device 640, method 900 continues to block 902 where the controller of advertising device 630 continues the status advertisement operation 602. In response to determining that the detected event does qualify for communication with receiving device 640 (such as event 702, for example), method 900 continues to block 908 where the controller of advertising device 630 generates event advertisement 620 associated with the detected event.

Method 900 can continue to block 910 where the controller of advertising device 630 pauses, suspends, or otherwise stops performing status advertisement operation 602. Method 900 can continue to block 912 where the controller of advertising device 630 begins event advertisement operation 604 by transmitting the event advertisement 620 via communication circuit 208. Method 900 can continue to block 914 where the controller of advertising device 630 determines whether a predetermined total period of time 705 for the event advertisement operation 604 has expired. In response to determining that the total time 705 for event advertisement operation 604 has not expired, method 900 repeats block 912 by again transmitting event advertisement 620. Accordingly, as those with skill in the art will understand, event advertisement operation 604 comprises the controller of advertising device 630 repeatedly performing blocks 912-914 within the event advertisement operation 604 predetermined total period of time 705 (such as 500 milliseconds, according to one example) and transmitting event advertisement 620 in block 912 at a second transmission rate 614 (such as once every 150 milliseconds, according to one example), which is faster than the transmission rate utilized in block 902 for the status advertisement operation 602.

In block 924, receiving device 640 receives event advertisement 620 from block 912 and the controller of receiving device 640 identifies the event section 424, 524 and processes event-specific information related to trigger event 702. In response to identifying the event-specific information in the event section 424, 524, the controller of receiving device 640 performs an action corresponding to event 702 in block 926. For example, as has been discussed, event 702 can be motion detected by a PIR sensor 232 of control device 200. Event information related to the detected motion can be included in event section 424. In response to operator 300 receiving event advertisement 420 and processing event section 424 and determining that the event 702 is detected motion within garage 102, controller 302 performs a preestablished corresponding action related to the event programmed controller 302, such as, for example, activating an overhead light of the UI 331 of operator 300 for a predetermined period of time. In examples where the advertising device 630 is operator 300, event information related to the detected trigger event 702 can be included in event section 524. In response to control device 200 receiving event advertisement 520 and processing event section 524 and determining the event 702, controller 202 performs a pre-established corresponding action related to the event programmed controller 202, such as, for example, displaying an associated message on a display UI 231 of control device 200 for a predetermined period of time.

After determining the total period of time 705 for performing event advertisement 604 has expired in block 914, method 900 can continue to block 916 where the controller of advertising device 630 resumes status advertisement operation 602 where advertising device 630 transmits status advertisement 610 at the first transmission rate 612. For example, the controller of advertising device 630 can resume method 900 at block 902 and continue performing status advertisement operation 602 until another event, such as trigger event 702, is detected. While method 900 illustrates blocks 902-926 occurring in a certain order, those with skill in the art will recognize that blocks 902-926 can be performed according to any of a number of orders without departing from the scope of this disclosure. Additionally, those with skill in the art will understand that blocks or steps and be added or removed from method 900 without departing from the scope of this disclosure.

The operations and methods in FIGS. 6-9 illustrate control device 200 as a one of the advertising devices 630 or the receiving device 640 and operator 300 as the other of the advertising device 630 or the receiving device 640. However, those with skill in the art will understand that methods and operations of FIGS. 6-9 can be applied to various other scenarios and system arrangements of this disclosure. According to various examples, one operator is an advertising device and transmits advertisements 510, 520 to another operator acting as the receiving device according to the various methods and operations illustrated in FIGS. 6-9. According to various examples, one control device is an advertising device and transmits advertisements 410, 420 to another control device acting as the receiving device according to the various methods and operations illustrated in FIGS. 6-9.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for communicating an event from a first device to a second device, comprising:

transmitting, by the first device, a status advertisement to the second device at a first transmission rate, the status advertisement including a status section corresponding to an operational status of a system including the first device and the second device;

detecting, by the first device, a trigger event triggering modified communication with the second device;

generating, by the first device in response to detecting the trigger event, an event advertisement including the status section and an event section corresponding to the trigger event;

pausing, by the first device, transmitting the status advertisement at the first transmission rate;

transmitting, by the first device to the second device, the event advertisement at a second transmission rate for a predetermined duration of time; and in response to the predetermined duration of time ending, resuming, by the first device, transmitting the status advertisement to the second device at the first transmission rate.

2. The method of claim 1, wherein the second transmission rate is a faster rate than the first transmission rate.

3. The method of claim 1, further comprising:

receiving, by the second device, the event advertisement; and in response to identifying the event section included in the event advertisement, performing, by the second device, an action associated with the trigger event.

4. The method of claim 1, wherein the predetermined duration of time is long enough such that the transmitting, by the first device, of the event advertisement at the second transmission rate comprises transmitting the event advertisement a plurality of times within the predetermined duration of time.

5. The method of claim 1, wherein the status advertisement and the event advertisement are each a Bluetooth or BLE advertisement.

6. The method of claim 1, wherein the first device is one of a movable barrier operator and a controlling device of a movable barrier system and the second device is the other of the movable barrier operator and the controlling device.

7. The method of claim 6, wherein the trigger event relates to an operating condition of the movable barrier system.

8. A device for transmitting wireless advertisements, comprising:

a wireless communication module; and a processor coupled with the wireless communication module and a memory storing instructions operable by the processor to:

transmit a status advertisement to a second device at a first transmission rate, the status advertisement including a status section corresponding to an operational status of a system including the device and the second device;

detect a trigger event triggering modified communication with the second device;

in response to detecting the trigger event, generate an event advertisement including the status section and an event section corresponding to the trigger event;

pause transmitting the status advertisement at the first transmission rate;

transmit the event advertisement to the second device at a second transmission rate for a predetermined duration of time; and in response to the predetermined duration of time ending, resume transmitting the status advertisement to the second device at the first transmission rate.

9. The device of claim 8, wherein the second transmission rate is a faster rate than the first transmission rate.

10. The device of claim 8, wherein the second device is configured to perform an action related to the trigger event in response to receiving the event advertisement.

11. The device of claim 8, wherein the predetermined duration of time is long enough such that the transmitting of the event advertisement at the second transmission rate comprises transmitting the event advertisement a plurality of times within the predetermined duration of time.

12. The device of claim 8, wherein the status advertisement and the event advertisement are each a Bluetooth or BLE advertisement.

13. The device of claim 8, wherein the device is one of a movable barrier operator and a controlling device of a movable barrier system and the second device is the other of the movable barrier operator and the controlling device.

14. The device of claim 13, wherein the trigger event relates to an operating condition of the movable barrier system.

15. A wireless communication system, comprising:

a central device; and a peripheral device configured to:

transmit a status advertisement to the central device at a first transmission rate, the status advertisement including a status section corresponding to an operational status of the wireless communication system;

detect a trigger event triggering modified communication with the central device;

in response to detecting the trigger event, generate an event advertisement including the status section and an event section corresponding to the trigger event;

pause transmitting the status advertisement at the first transmission rate;

transmit the event advertisement to the central device at a second transmission rate for a predetermined duration of time; and in response to the predetermined duration of time ending, resume transmitting the status advertisement to the central device at the first transmission rate.

16. The system of claim 15, wherein the second transmission rate is a faster rate than the first transmission rate.

17. The system of claim 15, wherein the predetermined duration of time is long enough such that the transmitting, by the peripheral device, the event advertisement at the second transmission rate comprises transmitting the event advertisement a plurality of times within the predetermined duration of time.

18. The system of claim 15, wherein the status advertisement and the event advertisement are each a Bluetooth or BLE advertisement.

19. The system of claim 15, wherein the peripheral device is further configured to:

receive the event advertisement; and in response to identifying the event section included in the event advertisement, perform an action associated with the trigger event.

20. The system of claim 15, wherein:

the system is a movable barrier system;

the central device is movable barrier operator;

the peripheral device is a controlling device; and the trigger event relates to an operating condition of the movable barrier system.

* * * * *